United States Patent Office 2,792,585
Patented May 21, 1957

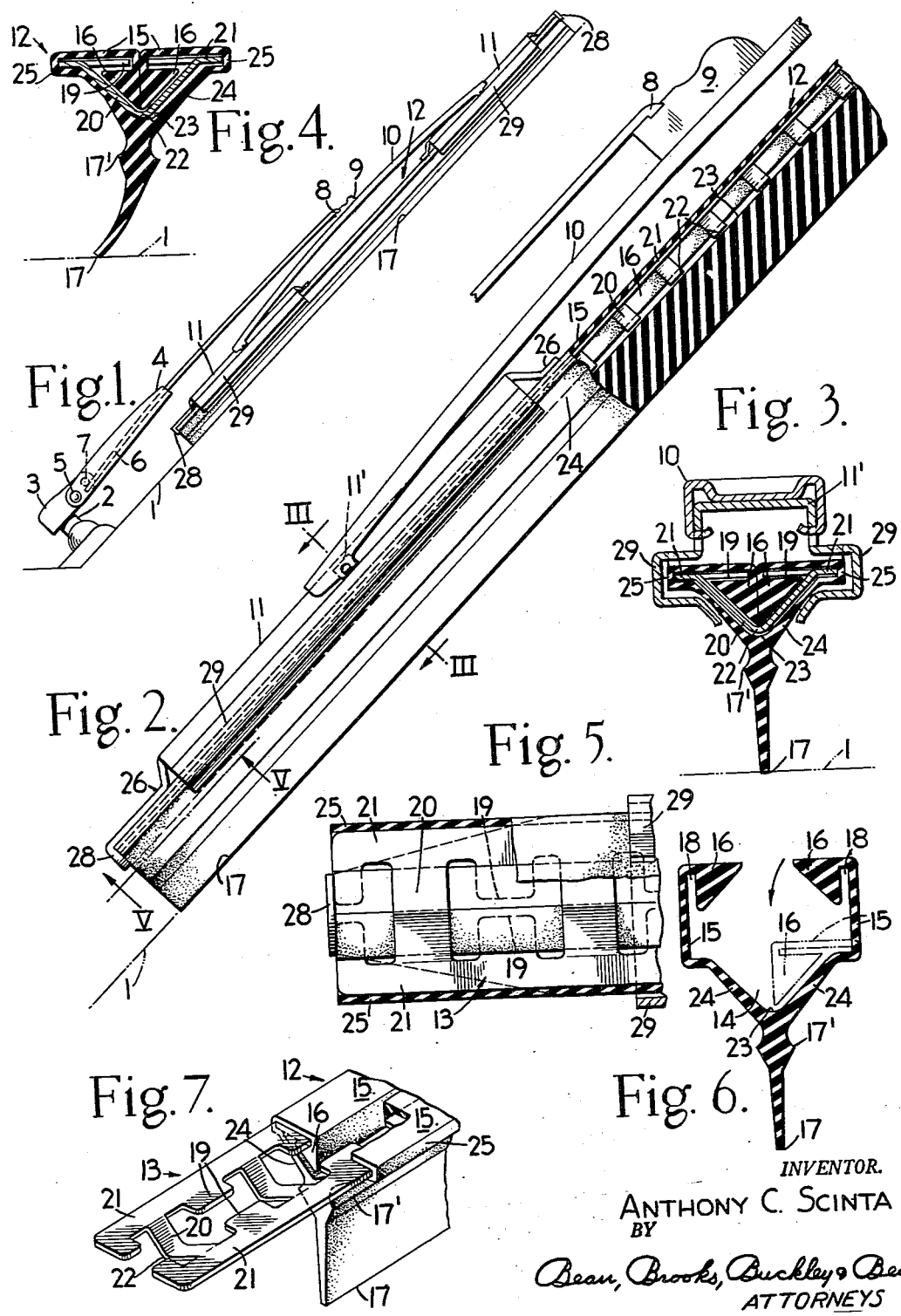

2,792,585
WINDSHIELD WIPER

Anthony C. Scinta, Buffalo, N. Y., assignor to Trico Products Corporation, Buffalo, N. Y.

Application April 2, 1952, Serial No. 280,045

17 Claims. (Cl. 15—245)

This invention relates to the windshield cleaning art and especially to a wiper that is primarily adapted for the cleaning of curved windshields and capable of wiping flat or curved surfaces, or a combination of the two having irregular and varying contours.

It has heretofore been proposed to incorporate a flexible backing in a wiping body and to suspend the backing between spaced points and in a manner to compel surface conformance of a wiping edge to the surface contour while in itself to afford lateral stability to the body to maintain the edge properly positioned for the greatest wiping efficiency. Such a construction is found in an earlier Patent No. 2,543,383, wherein a backing strip is molded within a rubber body to conform a wiping edge that is hinged thereto for lateral flexing.

The primary object of this invention is to provide a wiper of this type which lends itself more readily to present day methods of production and, further, to provide a more practical and durable design which will give a satisfactory performance under the rigorous conditions encountered during modern modes of travel.

The flexibility of the backing member is vital but its ruggedness and durability are limited by the dimensions of the blade, and of the arm on which it is mounted, and taking into account the available spring pressure requisite to cause the blade member to follow the contour of the glass. The arm pressure, itself limited by the torque available from the small driving motor for moving the blade, is reflected in the ruggedness in the backing member. One of the difficulties heretofore encountered in the use of the previously light flexible backing structures arises out of the fact that it is in an exposed position and when the wiper is manually lifted at a service station, as during a car washing, the lighter backing member is injured.

It is therefore desirable to incorporate in the backing member any and all support that can be provided through the rubber of the wiping element. According to the present invention, the backing member is concealed within the wiping element so that the latter becomes a shield and protective cover which serves to inclose the backing member against being inadvertently distorted and having its usefulness impaired. Protecting the backing member within a channel-like cover and encasing it in rubber make the wiper more practical and extends the useful life of the backing.

Another purpose of the invention is to utilize the maximum width of the wiping element in providing control of the blade and its backing member as a unit over the torque tending to rotate the unit about its longitudinal axis, and further to so design the backing member in the form of a flexible channel and to incorporate it within a chamber of the blade as to provide rockable support for the wiping edge close to its contact with the surface being wiped. Through this means the entire backing member is lowered so as to gain the effect of a single flat backing strip and yet provide the advantages of a channel holder, with the latter giving interrupted support at longitudinally spaced points all along the blade body from end to end. This desirable supporting result has the effect of stabilizing the wiping lip section of the blade, to better control its lateral movement and to secure the desired angular contact of the wiping edge or lip with the glass surface.

The present construction is likewise advantageous for winter driving in that the flexible backing is maintained fully operative regardless of the presence of wet snow, or at times when the road splashing of melting snow on the highways requires the use of an auxiliary water supply or washer. Under such conditions in a freezing temperature, ice can quickly form on an exposed backing or between it and the blade to defeat the proper flexure and functioning of the latter. The present invention contemplates a backing member in the nature of a flexible frame so arranged and related to the chamber walls of the blade as to cause such walls to flex and buckle for effecting the dislodgement of congealed or frozen deposits therefrom.

In the instant structure the body portion of the wiper element or blade includes two opposed marginal portions or sections for being interlocked by the backing member to anchor the blade against being dislodged or torn from the backing member by an abnormal tug or pull on a partially wet or dry glass. The arrangement affords complete insulation of the flexible backing member from a pressure distributing superstructure whereby the rocking of the blade in its wiping motion is accomplished without noise, thus providing a silent assembly from which the objectionable reversal click of metal contact is eliminated.

The foregoing and other objects will manifest themselves as this description progresses, reference therein being made to the accompanying drawing wherein:

Fig. 1 is a side elevation of the improved wiper operatively disposed on a windshield;

Fig. 2 is an enlarged fragmentary view of the wiper in side elevation with parts in section;

Fig. 3 is a transverse sectional view taken about on line 3—3 of Fig. 2;

Fig. 4 is a similar view of the blade unit alone in wiping posture;

Fig. 5 is a fragmentary longitudinal sectional view about on line 5—5 of Fig. 2;

Fig. 6 is a cross sectional view of the squeegee or blade per se; and

Fig. 7 is a fragmentary perspective view showing the backing being inserted into its chamber in the blade.

Referring more particularly to the drawing, the numeral 1 designates the windshield surface of a desired contour, 2 the actuating shaft of a windshield cleaner mechanism, 3 the mounting inner section of a wiper carrying arm, 4 the outer section of the arm, 5 the pin that pivotally joins the inner and outer sections, and 6 the spring that is carried by the outer section and bears upon a supporting part 7 of the inner section to provide the spring urge for pressing the blade against the surface. The wiper arm may have a curved outer terminal 8 to be rotatably engaged by a clip 9 for coupling the wiper thereto in pivotal relation, the clip being shown fixed to a bridge of rigid channel form 10 through and by which the arm pressure is distributed along the length of the blade. Auxiliary channeled rockable members 11 are interposed between the bridge and the blade to rotatably support the latter throughout its length, each secondary channel member being rockably mounted at 11' on a respective end of the primary yoke.

The blade unit comprises a flexible squeegee or blade 12 and a flexible backing 13 therefor. The backing is inclosed within the blade to protect it from wet snow packing against it and impairing its usefulness. To facilitate its inclosure, the blade in its preferred form has a longitudinally extending chamber 14 in its back portion with opposing side anchoring portions 15 serving as closure flaps that are adapted to be folded inwardly to jointly constitute the back wall of the blade. The free longitudinal margins of the closure flaps have anchoring beads 16.

The flexible backing 13 is strip-like, having greater width than thickness, and has its broad dimension lying crosswise of the blade to give lateral stability against pulling sideways from beneath the rockers while possessing surface-conforming flexibility to compel wiping contact of the blade edge 17 with the windshield surface. The backing strip may be of any suitable shape for being slid into the backing channel 14 through an open end thereof and during such sliding introduction the backing is caused to interlock with the anchoring beads to secure the blade to its backing support and to join the closure flaps together against the weather. To effect this interlock, the anchoring beads 16 are undercut at 18 to slidably to receive the retaining fingers 19 of the flexible backing. The fingers may be formed simply by cutting a row of H-shaped openings side by side in the strip, as by a stamping operation, thereby to leave cross straps 20 which alternate with pairs of opposed fingers 19 to form a flexible channel. The cross straps provide rigid transverse support and are depressed centrally to receive the anchoring beads 16 as well as to provide a longitudinal series of bends 22 on their undersides to serve as a fulcrum support for the wiping edge 17. As shown in Fig. 4, each cross strap is substantially V-shaped and conformably fits the bottom wall of the chamber as a saddle bearing so that the wiping edge, or its supporting web 17′, may have rockable support in the saddle 23 close to the line of wiping contact. This formation, in effect, provides a channel to receive the anchoring beads 16 where they are retained by the fingers 19 that extend inwardly from the side walls of the channel while the underside of channel bottom provides a flexible ridge upon which the wiping edge may rock laterally to assume the desired inclination for wiping.

It will be noted that the flexible backing channel performs a dual office, first to provide a surface-conforming backing for the wiping edge and secondly to connect the blade to its backing and to lock the closure flaps in their operative position.

As the wiping edge portion rocks back and forth on its saddle bearing, the upwardly diverging side walls 24 will alternately flex and buckle upon the supporting framework as provided by the cross straps to dislodge ice and snow therefrom. This action is assured by reason of the fact that none of the metal backing is exposed to the weather. Consequently any sleet and icy coating on the rubber blade will soon be displaced by the stretching and buckling action of the rubber body. The margins 21 are also inclosed by a protective layer of rubber which closely conforms to the strip design, as depicted at 25. The opposite ends of the rockers 11 may be extended at 26 to form transverse bearings over which the blade unit may flex. These transverse bearings 26 exert downward pressure on the backing in a balanced manner tending to normalize the blade with respect to the windshield surface. The remote ends of the rockers may be extended longitudinally to form retaining stops 28 for precluding endwise displacement of the blade unit from the superstructure, sufficient clearance being provided to enable the blade unit to readily conform to the surface contour under the spring arm urge as applied to the several longitudinally spaced points therealong. The downturned ends 28 also serve to close the open ends of the backing chamber 14.

During the movement of the blade over a relatively sharper curvature in the surface contour the back edge of the blade unit will recede into the yoke and rockers between their points of connection to each other and to the unit. Consequently, it is necessary to maintain ample clearance for such surface-conforming motion. Inclement wintry weather presents a hazard to ideal wiping action since wet snow will pack within the rockers and ice will form therein to block the receding movement of the unit. To preserve the desired freedom of flexing, each rocker is equipped with a hood 29 which incloses the clearance space. Where the rocker is channeled in cross section the hood may constitute extensions of the channel sides and follow somewhat closely the configuration of the wiper unit but with sufficient clearance to enable free surface-conforming action. The hood-forming side walls 29 broaden out from the sides of the rocker 11 to overlie the side margins of the blade unit. The transverse bearing supports 26 serve as fulcrum supports on which the backing may rock during its flexing recession and until arrested by the overhanging side walls of the weather hood. Such side walls extend down across the side marginal edges of the strips and may be spaced therefrom for such freedom of movement, or they may be in contact therewith. The side walls then converge inwardly beneath the blade unit and are shaped to present a broad face to the buckling walls 24 of the rubber body. The side walls 29 provide adequate protection for the relatively movable parts to prevent ice and snow accumulation to a motion-obstruction extent. The portions of the blade unit intermediate the sliding points of fulcrum support will freely move up and down between the side walls during wiping action to the extent permitted thereby which is ample for the intended purpose. A like hooded inclosure may be provided for the primary bridge, if desired.

The construction shown provides a practical method of providing a rubber wiping element comprising a channel section into which a backing member may be inserted. It is thus possible to produce a hollowed elongated wiping element in a practical manner and without necessarily molding the blade to and about the backing member as in the earlier patent. The combination produces a silent, substantially weatherproof blade and backing strip combination of more ruggedness than heretobefore produced and at the same time permits economical production methods to be employed in the production of the wiper.

The wiping edge oscillates on the row of apices 22 of the backing strip crossbars, being given interval support over its entire length as its light side walls 24 buckle on and stretch over the backing frame.

The improved wiper is an all-weather construction that is designed to maintain its surface-conforming flexibility during inclement weather, the flexible backing being fully inclosed by the blade to preclude ice and snow incrustation thereon as well as to insure a quite wiping performance. The required clearances between the parts are preserved to insure flexibility, and while the foregoing description has been given in detail it is apparent that the inventive principles may be incorporated in other physical embodiments without departing from the spirit of the invention and the scope of the appended claims.

What is claimed is:

1. A windshield wiper comprising an elongated flexible wiping blade having a wiping edge along one longitudinal margin and a longitudinally extending chamber having an opening through its opposite margin, and a flexible backing arranged in said chamber and providing a depending ridge of generally V-shape flexible with said backing and giving surface-conforming support to said wiping edge, said blade having anchoring flap means foldable over said chamber opening to completely enclose said backing therein and having means for attachment to said flexible backing for securing said blade thereto.

2. A windshield wiper comprising a flexible blade having a wiping edge along one longitudinal margin and a backing chamber in its opposite margin, a flexible backing strip arranged in said chamber and having side margins extending lengthwise of said wiping edge at opposite sides thereof, said blade having opposing anchor flaps foldable around said side margins and into said chamber to completely inclose said backing strip therein.

3. A windshield wiper comprising a flexible blade having a wiping edge along one longitudinal margin and a backing chamber in its opposite margin, a flexible backing strip arranged in the chamber and having its side margins extending lengthwise of the wiping edge at opposite sides thereof, said blade having opposing anchor flaps foldable over the side margins and into interlocking engagement with the backing strip to completely enclose the same within said chamber and to secure the backing strip to the blade.

4. A windshield wiper comprising a flexible blade, a backing therefor having greater width than thickness, said blade having a backing chamber with opposed anchor flaps foldable thereinto, said flaps having coacting anchoring beads extending into the chamber, and said backing being received within the chamber crosswise and having a longitudinal recess telescopically receiving the beads to secure the blade and backing together.

5. A wiper comprising a flexible blade having a longitudinal chamber with opposing closure members therefor, said closure members being formed with anchor beads disposed internally of said chamber when said closure members are in chamber closing position, and a flexible backing for the blade slidable into the chamber and having bead-receiving portions telescopically engaging the anchor beads to secure the closure members together in chamber closing position.

6. A wiper having a flexible blade with an open longitudinal chamber in its back portion, a flexible backing frame arranged in the chamber and having opposite side rails extending lengthwise of said blade and joined by a series of generally V-shaped cross straps providing a flexible depending ridge, said blade having a wiping edge portion depending from its back portion and the back portion of said blade being provided with upwardly diverging side walls straddling the ridge and rockably supporting the wiping edge portion thereon for assuming an inclined wiping posture.

7. A wiper having a flexible blade with an open longitudinal chamber in its back portion, a flexible backing frame arranged in the chamber and having opposite side margins extending lengthwise of the blade and joined by a series of cross straps centrally depressed to define a flexible depending ridge, said blade having a depending wiping edge portion and upwardly diverging side walls straddling the ridge and rockably supporting the wiping edge portion thereon for assuming an inclined wiping posture, said side walls freely resting upon the backing frame for buckling under the rocking action of the wiping edge portion.

8. A wiper for curved windshields, comprising a flexible blade having a wiping edge along one longitudinal margin and a backing chamber running lengthwise thereof and having weather closure flap means, a flexible surface-conforming backing received by said chamber and having opposite side margins, said flap means being arranged to overlie said side margins and engage said backing, and an arm-pressure distributing yoke having at its opposite ends blade-straddling parts slidably embracing said side margins of said backing and the overlying closure flap means to operatively support said backing and to hold said closure flap means closed.

9. In a windshield wiper for curved shields, an elongated wiping element having a hollowed body and opposed wall portions foldable thereover, an elongated flexible backing member in the body hollow, said backing member having an opening lengthwise thereof receiving the outer margins of said wall portions when folded to completely enclose said backing member, and means whereby said wiping element and said backing member may be interlocked together.

10. In a windshield wiper for curved shields, an elongated wiping element having a hollowed section extending from end to end thereof, an elongated backing member received in the hollow of the wiping element, said wiping element having integral side extensions foldable around the backing member to conceal the same within the confines of the wiping element and having parts interlocking with the backing member to secure said wiping element thereto, and holder means arranged to support the wiping element and its backing and acting to transmit pressure from a wiper arm to the wiping element and its backing to conform the same to the surface contours being wiped.

11. In a window wiper for curved glass, an elongated flexible wiping element having a longitudinal chamber therein, and a flexible backing member disposed in said chamber, said backing member having side margins extending lengthwise of said wiping element and retaining finger means extending inwardly therefrom, and said wiping element being provided with side flaps foldable inwardly from the outer side margins of said wiping element over said backing member side margins and having anchoring beads undercut to receive said retaining finger means, whereby to secure said wiping element to said backing member.

12. In a windshield wiper for curved glass, an elongated wiping element comprising a body portion having a V-shaped chamber extending longitudinally from end to end thereof, a generally V-shaped flexible backing member conformably fitting the chamber and internally supporting the opposite side and bottom wall parts of said body portion, said wiping element being provided with a longitudinal wiping lip extending from the bottom wall part of said body portion and thereby being supported by said backing member, and pressure distributing means arranged to carry the wiping element and its backing member whereby wiper arm pressure may be distributed longitudinally thereof to cause the wiping element and its backing member to conform to the surface of the glass.

13. In a windshield wiper for curved glass, an elongated flexible wiping element having a longitudinal chamber, a backing member in the chamber, said wiping element being provided with side flaps designed to be folded inwardly over the backing member from the outer side margins of the wiper element and having parts arranged for interlocking engagement with the backing member to secure the wiping element thereto, and a pressure distributing superstructure including a channeled rocker inverted over the folded margins to form a weather inclosure.

14. In a windshield wiper for curved glass, an elongated flexible wiping element having a longitudinal chamber, a backing member in the chamber, said wiping element being provided with side flaps designed to be folded inwardly over the backing member from the outer side margins of the wiper element and having parts engaging the backing member to secure the wiping element thereto, a pressure-distributing bridge having arm attaching means, and a channeled rocker carried by the bridge and inverted over the back of the wiping element and loosely straddling the backing member.

15. In a windshield wiper for curved glass, an elongated flexible wiping element having a longitudinal chamber, a backing member in the chamber, said wiping element being provided with side flaps designed to be folded inwardly from the outer side margins of the wiping element and having parts engaging the backing member to secure the wiping element thereto, a pressure-distributing bridge having arm attaching means, and a channeled rocker carried by the bridge and inverted over the back of the wiping element, the side walls of the channel being extended to straddle the backing member freely to enable flexing of the wiping element with the backing member up into the channel.

16. In a windshield wiper for curved shields, an elongated wiping element having a hollowed body portion and foldable wall portions, and an elongated flexible backing therefor having a longitudinal opening therein, whereby the wall portions of the wiping element may be folded for endwise slidable assembly into interlocking relationship with said backing to secure the same in said hollowed body portion.

17. In a windshield wiper for curved shields, an elongated wiping member having a hollowed section extending from end to end thereof, an elongated flexible backing member therein, the said wiping element having integral side extensions foldable over said hollowed section for endwise slidable assembly with said backing member, said side extensions having parts interlocking with said backing member, and holder means arranged to support the wiping element and its backing whereby pressure from a wiper arm may be transmitted to the wiping element and its backing to conform to the contours of the glass.

References Cited in the file of this patent

UNITED STATES PATENTS

| | | |
|---|---|---|
| 2,011,015 | Schleicher | Aug. 13, 1935 |
| 2,063,375 | Harvey et al. | Dec. 8, 1936 |
| 2,589,339 | Carson | Mar. 8, 1952 |
| 2,700,785 | Oishei et al. | Feb. 1, 1955 |
| 2,728,100 | Oishei | Dec. 27, 1955 |

FOREIGN PATENTS

| | | |
|---|---|---|
| 619,320 | Great Britain | of 1949 |